US011939190B2

(12) United States Patent
Kong et al.

(10) Patent No.: US 11,939,190 B2
(45) Date of Patent: Mar. 26, 2024

(54) ELEVATING APPARATUS BASED ON HETERO-ORIENTED, NON-ISOMETRIC, DUAL-SPIRAL DRIVE STRUCTURE

(71) Applicants: TAIZHOU UNIVERSITY, Taizhou (CN); JIANGSU ZHIJI ENVIRONMENTAL PROTECTION TECHNOLOGY CO., LTD., Suqian (CN)

(72) Inventors: Xiangdong Kong, Taizhou (CN); Ping Dong, Suqian (CN)

(73) Assignees: TAIZHOU UNIVERSITY, Taizhou (CN); JIANGSU ZHIJI ENVIORNMENTAL PROTECTION TECHNOLOGY CO., LTD., Suqian (CN)

( * ) Notice: Subject to any disclaimer, the term of this patent is extended or adjusted under 35 U.S.C. 154(b) by 438 days.

(21) Appl. No.: 17/444,632

(22) Filed: Aug. 6, 2021

(65) Prior Publication Data

US 2022/0332544 A1 Oct. 20, 2022

(30) Foreign Application Priority Data

Apr. 15, 2021 (CN) ......................... 202110408952.7

(51) Int. Cl.

*B66B 9/08* (2006.01)
*B66F 3/10* (2006.01)
*E04F 11/032* (2006.01)

(52) U.S. Cl.

CPC .................. *B66B 9/08* (2013.01); *B66F 3/10* (2013.01); *E04F 11/032* (2013.01)

(58) Field of Classification Search

CPC ... B66B 9/0815; B66B 9/0807; B66B 9/0853; E04H 6/282

See application file for complete search history.

(56) References Cited

U.S. PATENT DOCUMENTS

| | | | | |
|---|---|---|---|---|
| 1,539,761 A * | 5/1925 | Murray | E04H 6/282 414/247 |
| 2014/0069771 A1 | 3/2014 | Strieter et al. | |
| 2018/0170716 A1 | 6/2018 | Zhu et al. | |

FOREIGN PATENT DOCUMENTS

| | | | |
|---|---|---|---|
| CN | 103209919 A | 7/2013 | |
| CN | 105668398 A | 6/2016 | |
| CN | 108708612 A * | 10/2018 | E04H 6/282 |
| CN | 112081440 A * | 12/2020 | |

(Continued)

*Primary Examiner* — Diem M Tran

(74) *Attorney, Agent, or Firm* — Michael Ye; Rimon Law

(57) ABSTRACT

The present invention relates an elevating apparatus based on a hetero-oriented non-isometric, dual-spiral drive structure, comprising a first carrier and a second carrier, further comprising a first support and a second support that are telescoped together in a manner that they can rotate with respect to each other, the first support is provided with a first recessed portion and a first raised portion that shares the same spiral direction and spiral pitch, the second support is provided with a homo-oriented, isometric, dual-spiral second recessed portion that has a spiral direction different from that of the first recessed portion. The carrier of the present invention is provided in a simply-supported-beam, and the carrier force can be achieved without additional weight, and the operation is stable and reliable.

20 Claims, 5 Drawing Sheets

(56) References Cited

FOREIGN PATENT DOCUMENTS

| | | | | | |
|---|---|---|---|---|---|
| CN | 2021104089527 | | | 5/2021 | |
| CN | 113104702 | A | * | 7/2021 | ......... B66B 11/0035 |
| CN | 113104703 | B | | 8/2022 | |
| EP | 1489035 | A2 | * | 12/2004 | ............. B66B 23/02 |
| ES | 2813124 | A1 | * | 3/2021 | ............... B66B 9/08 |
| JP | 2003341959 | A | | 12/2003 | |

* cited by examiner

ELEVATING APPARATUS BASED ON HETERO-ORIENTED, NON-ISOMETRIC, DUAL-SPIRAL DRIVE STRUCTURE

This application claims the benefit of the Chinese Patent Applications No. CN 202110408952.7 filed on Apr. 15, 2021, which is hereby incorporated by reference as if fully set forth herein.

BACKGROUND OF THE INVENTION

1. Technical Field

The present invention relates to elevators or elevating apparatuses, and more particularly to an elevating apparatus based on a hetero-oriented, non-isometric, dual-spiral drive structure.

2. Description of Related Art

An elevating apparatus or an elevator is configured to transport people or articles to a designated level in a building or to a designated height outdoor safely. It is usually desired to equip an existing building like a house, a landscape platform, or a garage with an elevator or an elevating apparatus as a part of renovation for providing convenience to physically challenged people. Adding an elevating apparatus or an elevator to an existing building needs a robust plan based on the layout of the building for ensuring architectural safety and special efficiency while maximizing the resulting transport capacity, without occupying the existing stairwell.

Generally, the known elevators or elevating apparatuses are driven by traction drives, hydraulic drives or traction-hydraulic drives. A traction drive typically uses steel wires for traction. If a weight is used in order to reduce the required driving motor in terms of power output, the overall elevator takes more space than the case that there is no weight incorporated. In addition, if an elevator has its guide rail arranged at only one side, loads can concentrate on the guide rail of that side. Over time, this can in turn increase guide shoe wear, operational instability and noise. As an alternative of a weight, a motor may be used to drive the traction wheel to rotate and then drive the elevator to move upward and downward. While this solution advantageously makes efficient use of the well space, it needs a driving power equal to at least twice of the power as needed by a traction elevator using a weight. A hydraulic elevator or elevating apparatus, when used in a building with relatively small height, provides more stable operation than a traction-driven one. However, it needs a large elevator well to accommodate its hydraulic drive structure, and it needs more material and therefore higher costs.

Further, since there is certainly discrepancy between the prior art comprehended by the applicant of this patent application and that known by the patent examiners and since there are many details and disclosures disclosed in literatures and patent documents that have been referred by the applicant during creation of the present invention not exhaustively recited here, it is to be noted that the present invention shall actually include technical features of all of these prior-art works, and the applicant reserves the right to supplement the application with technical features known in the art as support.

SUMMARY OF THE INVENTION

In order to solve the problems of existing knowledge, the present invention provides an elevating apparatus based on a hetero-oriented non-isometric, dual-spiral drive structure, comprising a first carrier and a second carrier, further comprising a first support and a second support that are telescoped together in a manner that they can rotate with respect to each other, the first support is provided with a first recessed portion and a first raised portion that shares the same spiral direction and spiral pitch, the second support is provided with a homo-oriented, isometric, dual-spiral second recessed portion that has a spiral direction different from that of the first recessed portion, wherein the first carrier is connected to the first support along the first raised portion in a manner that it spirally encircles the first support; and the second carrier acquires, in a manner that it passes through the first recessed portion and the second recessed portion to connect to and/or lean against the first raised portion, a driving force that is provided by rotation of the second support and drives the second carrier to move along the first recessed portion. Opposite to the known elevators that use drive mechanisms such as steel wires, pulleys, guide rails, and hydraulic drives to drive the elevator cars, the present invention drives the second carrier without complicated, segmented connection because the force-bearing condition of the second carrier is relatively simple. In the present invention, the first support and the second support jointly support the first carrier and the second carrier, and the fact that the first carrier and the second carrier are separated by 180° along the circumference of the cross section of the first support causes the force they receive to be fully cancelled by each other. These means that the disclosed elevating apparatus receive less force as compared to the known cantilever-type elevators/elevating apparatuses moving on two rails along the wall. Furthermore, the first raised portion and the second recessed portion of the present invention support the connector in a simply-supported-beam manner, thus making the second carrier more stable when bearing loads and making the forces exerted on the first support and the second support more balanced as compared to the conventional cantilever-beam-like force-bearing structure. This effectively reduces wear to which the first support, the first recessed portion, the second support, and the second recessed portion might otherwise subject. Some existing elevators/elevating apparatuses are equipped with additional weights with the attempt to achieve stable operation, but this leads to increased mechanical complexity, increased volume, increased footprint, and increased costs, which are undesired. Similar to the known devices, the present invention drives the carriers to move, but the carriers as disclosed in the present invention is differently configured like a simple beam, and the carrier force can be achieved without additional weight, and the operation is more stable and more reliable. Additionally, the disclosed simply-supported-beam force-bearing structure when applied to renovation of an existing building can significantly reduce requirements to the original support structure (i.e., the wall) of the existing spiral stairs, and in subsequent use can minimize possible damage to the renovated building, thereby in turn reducing maintenance costs. The disclosed simply-supported-beam force-bearing structure when applied to a newly constructed structure, such as the case where the first support and the second support of the present invention are combined with an existing building structure, only takes a small space and in venture of its good force-bearing structure and simple drive structure, the combination can be easily achieved by attaching the first support and the second support to the existing building structure. Furthermore, the present invention requires no special materials for the first support and the second support to support the first carrier and the second carrier, thereby reducing costs.

The present invention further provides an elevating apparatus based on a hetero-oriented, non-isometric, dual-spiral drive structure, comprising a first support and a second support that are telescoped together in a manner that they can rotate with respect to each other. The first support is connected to a first carrier encircling the first support. The first support is provided with a first recessed portion that serves to limit the second carrier to spirally move upward/downward and is such configured that it and the first carrier does not interfere with each other. The first support is provided with a first raised portion that is corresponding to the place where it connects the first carrier and is arranged opposite to the first recessed portion. Alternatively, the first support is provided with a third recessed portion that serves to limit the first carrier to spirally move upward/downward and is such configured that it does not interfere with the second carrier. The second support is provided with a second recessed portion that serves to provide the first carrier and/or the second carrier with a force along the axis of the first support. A connector connected to the second carrier connects and/or leans against the first raised portion or the third recessed portion in a manner that it passes through the first recessed portion and the second recessed portion to form, together with the second support and/or the first support, a simply-supported-beam force-bearing structure.

The present invention further provides an elevating apparatus based on a hetero-oriented, non-isometric, dual-spiral drive structure, comprising a first support and a second support that are telescoped together in a manner that they can rotate with respect to each other. The elevating apparatus further comprises a first carrier and a second carrier that spirally encircle the first support. The first support is provided with a first recessed portion that serves to limit the second carrier to spirally move upward/downward and is such configured that it and the first carrier do not interfere with each other. The second support is provided with a second recessed portion that provides the first carrier and/or the second carrier with a force along the axis of the first support. A connector connected to the second carrier connects and/or leans against the first carrier in a manner that it passes through the first recessed portion and the second recessed portion to form, together with the second support and/or the first support, a simply-supported-beam force-bearing structure. Alternatively, a connector connected to the second carrier connects and/or leans against the first raised portion that is deposited on the side of the first support facing the second support and is corresponding to the connection profile of the first carrier in a manner that it passes through the first recessed portion and the second recessed portion to form, together with the second support and/or the first support, a simply-supported-beam force-bearing structure.

The present invention further provides an elevating apparatus based on a hetero-oriented, non-isometric, dual-spiral drive structure, comprising a first support and a second support that are telescoped together in a manner that they can rotate with respect to each other, the first support is provided with a first recessed portion and a first raised portion that shares the same spiral direction and spiral pitch. Preferably, the first raised portion and the first recessed portion are separated by 180° along the circumference of the cross section of the first support. Preferably, the first raised portion and the first recessed portion may be arranged symmetrically about the axis of the first support. The second support is provided with a second recessed portion that has a spiral direction different from that of the first recessed portion and has opposite openings in its radial section The first carrier is such configured that it spirally encircles the first support along the first raised portion. The second carrier acquires, in a manner that it passes through the first recessed portion and the second recessed portion to connect to and/or lean against the first raised portion, a driving force that is provided by rotation of the second support and drives the second carrier to move along the first recessed portion.

According to one preferred embodiment, a homo-oriented, isometric, dual-spiral configuration formed by the first recessed portion and the first raised portion has a spiral pitch that is greater than a spiral pitch of the second recessed portion; or an axial displacement occurring when the first recessed portion makes one revolution with the first support is greater than an axial displacement when the second recessed portion makes one revolution with the second support.

According to one preferred embodiment, where the second support rotates with respect to the first support, a force along an axis of the second support exerted by the second recessed portion on the connector connected to the second carrier is greater than a force along an axis of the second support exerted by the first recessed portion on the connector. Or where the second support rotates with respect to the first support, a force along an axis of the second support exerted by the second recessed portion on the connector connected to the second carrier is greater than a force along an axis of the second support exerted by the first recessed portion on the connector.

According to one preferred embodiment, the first carrier passes through a lateral wall of the first support and extends into the first raised portion, in which the first raised portion and the connector lean against each other.

According to one preferred embodiment, a terminal of the connector is provided with a first connecting arm that leans against the first raised portion, in which the first raised portion is located between two terminals of the first connecting arm, in which where the second support rotates with respect to the first support to drive the connector to rotate, the first connecting arm slides and/or rolls with respect to the first raised portion in a manner that it grips on the first raised portion.

According to one preferred embodiment, the connector leans against and/or connects with the second recessed portion through a second connecting arm, wherein the second connecting arm includes a second rolling member and a second raised portion, in which the second rolling member is deposited between the second recessed portion and the connector; the second raised portion serves to prevent the connector from moving along a radial direction of the second support.

According to one preferred embodiment, the second raised portion is deposited on one side of the second support that faces the first support, and/or the second raised portion is deposited on one side of the second support that is opposite to the first support.

According to one preferred embodiment, the second connecting arm comprises a first rod, which includes a first segment and a second segment, wherein the second rolling member is sleeved around the first segment of the first rod; and the second raised portion is sleeved around the second segment of the first rod.

DETAILED DESCRIPTION OF THE INVENTION

The present invention will be described in detail with reference to the accompanying drawings.

Embodiment 1

The present invention provides an elevator/elevating apparatus, which is designed to be integrated with spiral stairs in a stairwell with separation between the elevator channel and the stairwell. Meanwhile, the elevator/elevating apparatus of the present invention uses a drive different form the traditional traction drives, hydraulic drives and combinations thereof, and this allows the disclosed elevating apparatus to simplify its drive structure and optimize its transport capacity, thereby making the elevator/elevating apparatus safe and stable in operation. To add an elevator to an existing building, the renovation is usually made using the wall of the ladder way defining the existing stairwell, and the following problems have to be solved:

1. The known traction drives and hydraulic drives are stable in operation and are demanding in terms of space and function;

2. Since the elevator car or carrying mechanism is hung on the wall of the ladder way defining the existing stairwell, the structure acts as a cantilever beam, which transfer forces at only one side, subjecting the building to an undesired force-bearing pattern building structure and limiting the transport capability.

One objective of the elevator/elevating apparatus of the present invention is to, on the basis of separation between the elevator channel and the stairwell that prevents mutual interference and increases transport channels, provide safe and reliable operation in the limited space of an existing building, thereby eliminating safety concern and capability limitation as those otherwise caused by a cantilever-beam-like force-bearing structure in which the elevator car/carrying mechanism moves vertically along the support structure.

Figure 1:
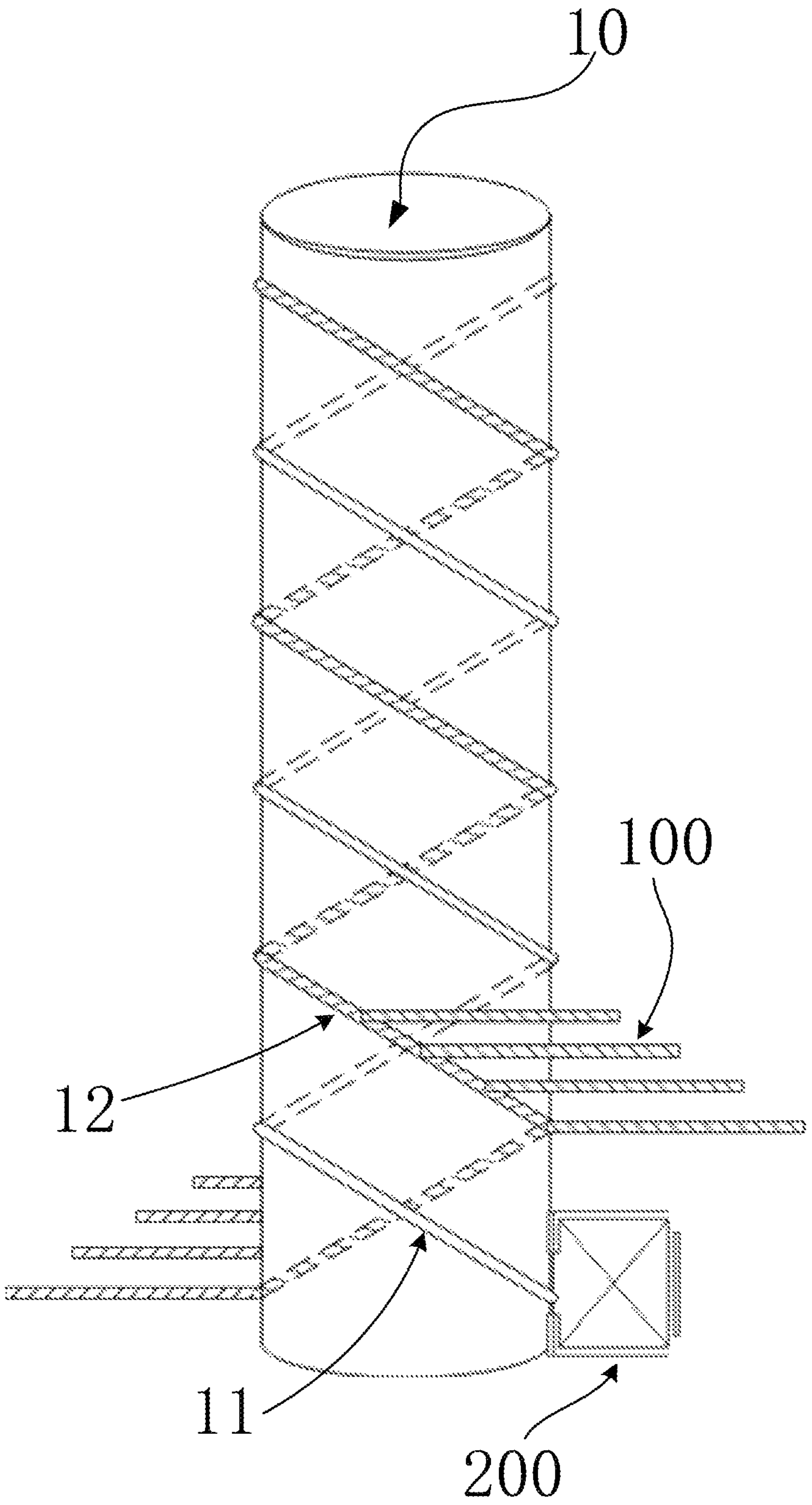
FIG. 1 is a schematic structural drawing of a preferred implementation of an elevating apparatus of the present invention.
Figure 2:
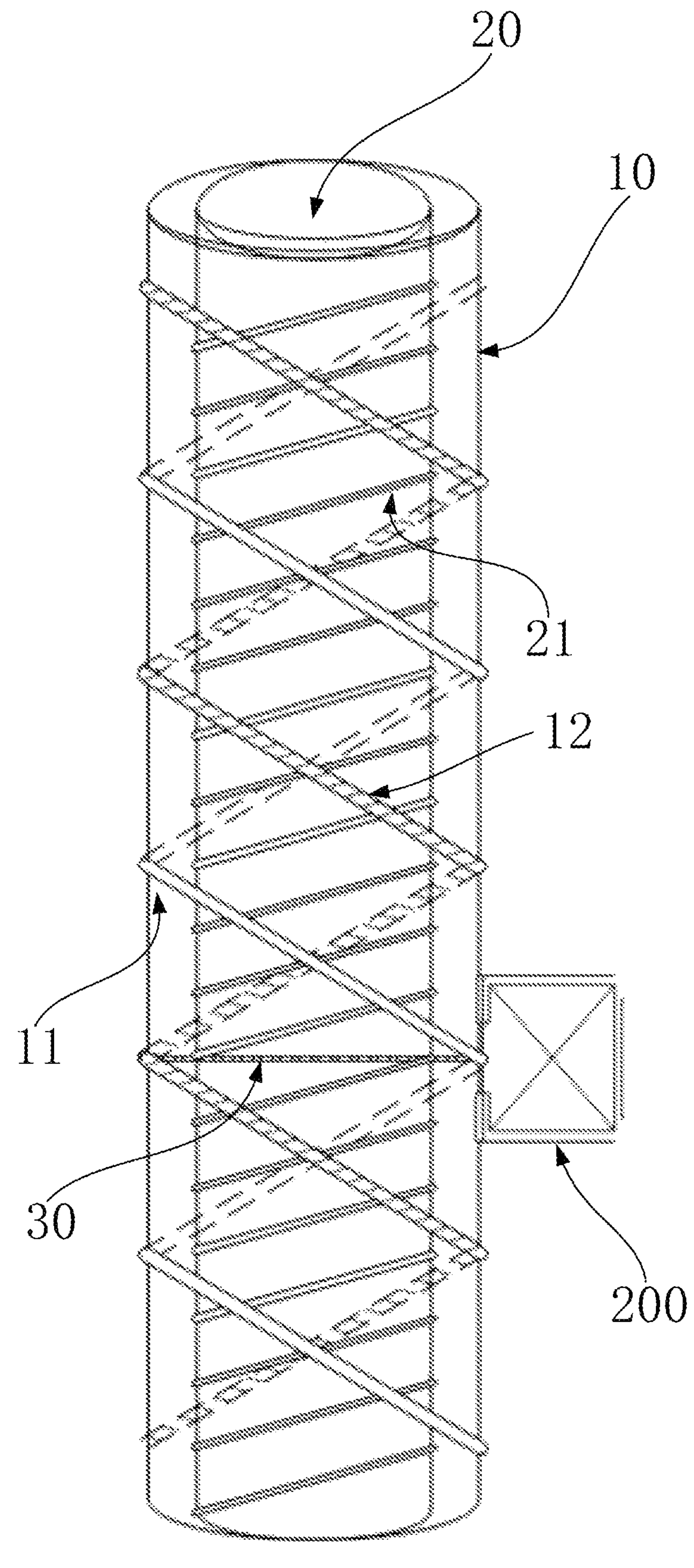
FIG. 2 is a schematic structural drawing of a preferred implementation of the elevating apparatus, showing the first support and the second support according to the present invention.

Referring to FIG. 1 and FIG. 2, an elevating apparatus according to the present invention comprises a first support 10 and a second support 20. The first support 10 may be a columnar member. The second support 20 may be a columnar member. The first support 10 and the second support 20 each have a round radial section. Referring to FIG. 1, The first support 10 is provided with a first recessed portion 11 and a first raised portion 12. The first recessed portion 11 may be spiral. The first raised portion 12 may be spiral. Referring to FIG. 1 and FIG. 2, the first recessed portion 11 and the first raised portion 12 are arranged alternately. The first recessed portion 11 and the first raised portion 12 shares the same spiral pitch and spiral direction. The spiral direction refers to the direction the referred spiral follows. The first raised portion 12 is deposited on the inner side of the first support 10. The first raised portion 12 is deposited on the side of the first support 10 facing the second support 20. The first raised portion 12 is raised toward at the side facing the second support 20. Preferably, the first recessed portion 11 and the first raised portion 12 are such distributed that they are separated by 180° along the circumference of the cross section of the first support 10. Preferably, the first raised portion 12 and the first recessed portion 11 may be such arranged that they are symmetrical about the axis of the first support 10. The foregoing configuration ensures a connector 30 inserted therein remains horizontal all the time. Preferably, the connector 30 connected to the second carrier 200 first passes through the first recessed portion 11 and then connects and/or leans against the first raised portion 12 such that the connector 30 passes through the axis of the first support 10, as shown in FIG. 2.

Figure 3:
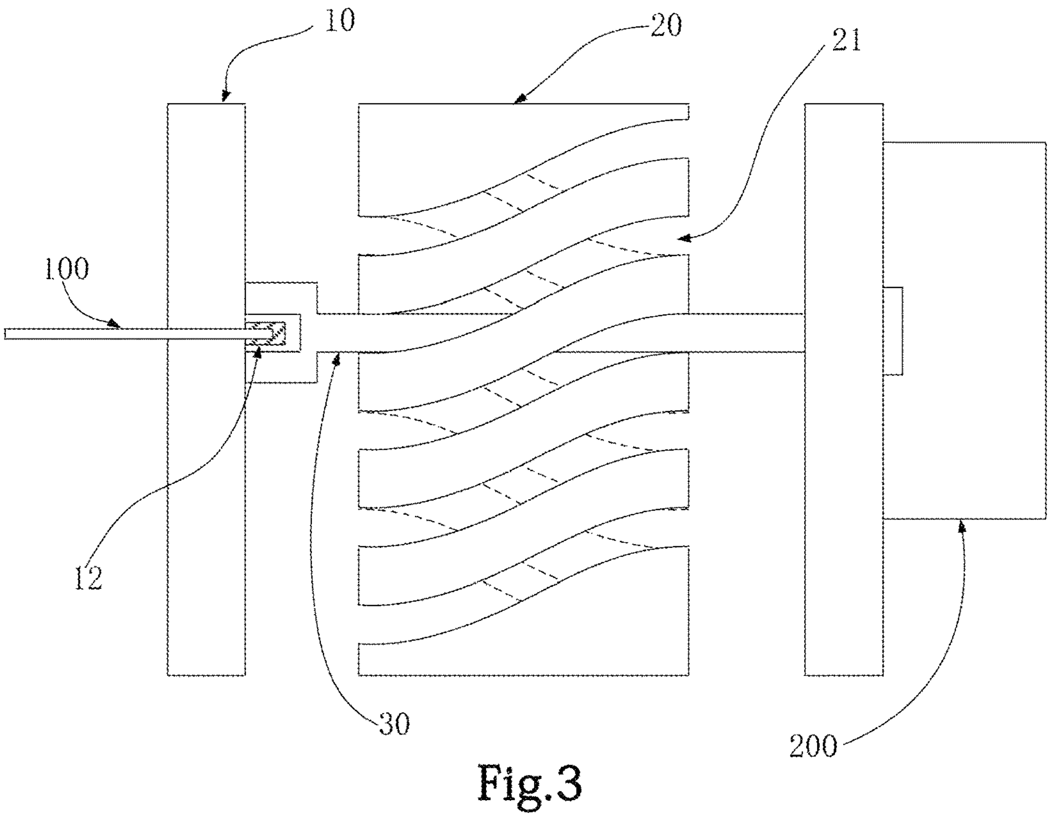
FIG. 3 is a schematic structural drawing of a preferred implementation of the elevating apparatus, showing the second support according to the present invention.
Figure 4:
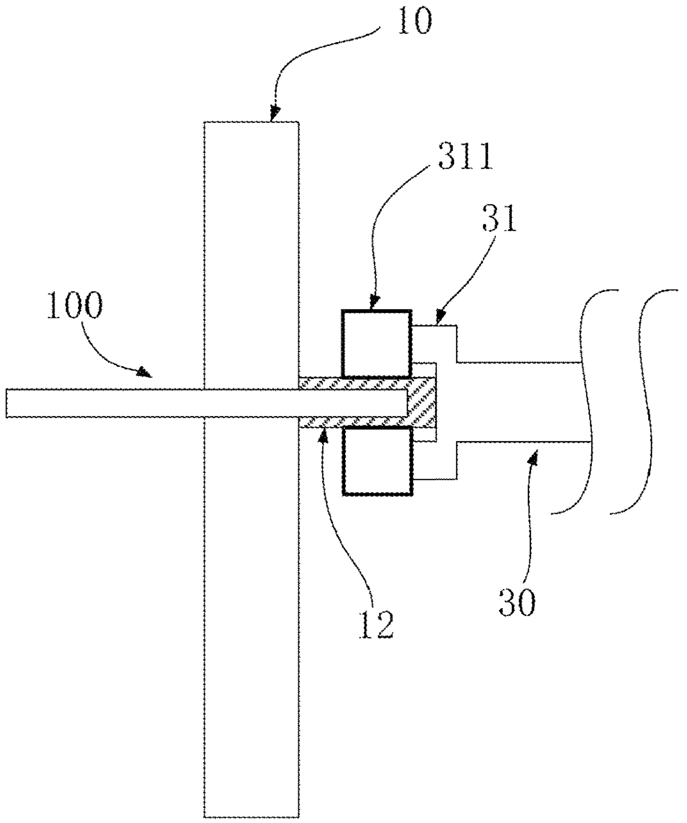
FIG. 4 is a schematic structural drawing of a preferred implementation of the connector and the first carrier lean against each other according to the present invention.

Preferably, the first support 10 is connected to a first carrier 100. In the present embodiment, the first carrier 100 may a set of spiral stairs. The connection profile of the first carrier 100 and the first support 10 as mapped on the first support 10 coincides with the first raised portion 12. In the present embodiment, the first carrier 100 may be connected to the first support 10 through the first raised portion 12. Specifically, as shown in FIG. 3 and FIG. 4, the first carrier 100 passes through the lateral wall of the first support 10 and goes into the first raised portion 12. In particular, one side of the first carrier 100 extends into the first raised portion 12 after passing through the lateral wall of the first support 10. Preferably, the first carrier 100 is such arranged that it forms a spiral around the first support 10 along the first raised portion 12, as shown in FIG. 1. The spiral-like path defined by the joints between the first carrier 100 and the first support 10 coincides the first raised portion 12.

Preferably, a second carrier 200 is provided at one side of the first support 10. The second carrier 200 may be an elevator car or a lift platform. Referring to FIG. 1 and FIG. 2, the second carrier 200 is configured to move along the first recessed portion 11. With the foregoing configuration, since the first recessed portion 11 and the first raised portion 12 have the same spiral direction and spiral pitch, and they are arranged alternately, the imaginary line between the second carrier 200 and the first carrier 100 in the radial section of the first support 10 passes through the axis of the first support 10, as shown in FIG. 1. Preferably, the second carrier 200 and the first carrier 100 are opposite to each other. With the foregoing configuration, the second carrier 200 and the first carrier 100 include an angle of 180°, so that the first support 10 and the second support 20 each receive loads at their two sides simultaneously, thereby ensuring force equilibrium. This reduces the risk that the first support 10 and/or the second support 20 topple over due to unbalanced loads. In addition, since the included angle between the second carrier 200 and the first carrier 100 is 180°, they are non-interfering with each other. Besides, since the first recessed portion 11 and the first raised portion 12 are in homo-oriented and isometric while arranged alternately, the free space in the axial direction of the first support 10 is left available, thereby further preventing the second carrier 20 from interfering with people using the first carrier 100. For example, in an implementation where the first carrier 100 is spiral stairs, there are cases where people taking the spiral stairs move in homo-oriented as the second carrier 200. At this time, the second carrier 200 may move in the free space above the first carrier 100, thereby eliminating interference between stair users and the second carrier 200.

The known elevators/elevating apparatuses usually use drive mechanisms such as steel wires, pulleys, guide rails, and hydraulic drives to drive the second carrier 200 to spirally go upward and downward along walls or along the first recessed portion 11. This causes safety concerns because the building wall has to bear the weight of the second carrier 200, and the second carrier 200 works like a cantilever beam, meaning that forces acting on the second carrier 200 and the building are instable. Moreover, in some existing elevators/elevating apparatuses, the second carrier 200 is equipped with additional weights with the attempt to achieve stable operation, but this leads to increased mechanical complexity, increased volume, increased footprint, and increased costs, which are undesired. Similar to the known devices, the present invention drives the second carrier 200 to move along the first recessed portion 11, but the second carrier 200 as disclosed in the present invention is differently configured like a simple beam. As it uses the connection between the first carrier 100 and the first raised portion 12, the need of additional weights can be eliminated while operation of the second carrier 200 is more stable and more reliable.

Preferably, the second carrier 200 may be connected to the first support 10 and/or the second support 20. The second carrier 200 may lean against the first support 10 and/or the second support 20. Specifically, the second carrier 200 is provided with a connector 30. Referring to FIG. 2 and FIG. 3, the connector 30 passes through the first support 10 and the second support 20. Preferably, the connector 30 passes through the first recessed portion 11. The connector 30 passes through the first recessed portion 11 and extends to the second support 20. Referring to FIG. 2 and FIG. 3, the second support 20 is provided with a second recessed portion 21. The second recessed portion 21 may be of a double spiral structure. The second recessed portion 21 may be composed of two spiral-shaped recessed portions. In particular, the second recessed portion 21 may be composed of two spiral-shaped recessed portions that are separate from each other and have the same spiral pitch as well as the same spiral direction. Preferably, the second recessed portion 21 may be composed of two spirals having the homo-oriented and isometric. Preferably, the second support 20 may be hollow. With the foregoing configuration, the second support 20 leaves a channel in its radial direction for the connector 30 to pass through. The connector 30 may pass through the axis of the second support 20 and/or the first support 10 in a direction perpendicular to the axis of the second support 20 and/or the first support 10 as it passes through the second recessed portion 21.

Referring to FIG. 3, the connector 30 passes through the second support 20. The connector 30 passes through the second recessed portion 21. The connector 30 passes through the first recessed portion 11 and the second recessed portion 21. The connector 30 passes through the first recessed portion 11 and the second recessed portion 21 and extends into the gap between the first support 10 and the second support 20. The connector 30 may pass through the first recessed portion 11 and the second support 20 and extend to the side of the second support 20 remote from the first recessed portion 11. The connector 30 may pass through the first recessed portion 11 and the second recessed portion 21 and then connect and/or lean against the first raised portion 12. Preferably, the connector 30 and the first recessed portion 11 may lean against each other. The connector 30 and the second recessed portion 21 may lean against each other. With the foregoing configuration, the support structure the connector 30 and at least the second support 20 acts as a simple beam. Specifically, the connector 30 passes through the axis of the second support 20 while passing through the second recessed portion 21, so that the second support 20, through the second recessed portion 21, provides the connector 30 with two catch points that are centrally symmetrical to each other. This makes the second carrier 200 and the second support 20 as a whole form a force-bearing structure working like a simple beam. Such a force-bearing structure makes the second carrier 200 more stable under loads and reduces the force exerted on the first recessed portion 11 by the second carrier 200, or, the force applied on the first support 10. For example, as compared to a cantilever-beam-like force-bearing structure otherwise formed by the second carrier spirally moving upward/downward along the support wall of the spiral stairs or the wall of other supports, the simply-supported-beam force-bearing structure of the present invention formed by the second carrier 200 and the connector 30 can significantly reduce the force acting on the support wall of the spiral stairs.

In the following description, the configurations of the second recessed portion 21 of the second support 20 and the connector 30 will be detailed to explain how the first support 10 and the second support 20 of the present invention drive the connector 30 to make the second carrier 200 move along the first recessed portion 11.

Referring to FIG. 2, the first support 10 and the second support 20 are telescoped together in a manner that they can rotate with respect to each other. Preferably, the first support 10 and the second support 20 are installed coaxially. The first support 10 and the second support 20 rotating with respect to each other includes that the first support 10 stands still while the second support 20 rotates. The first support 10 and the second support 20 rotating with respect to each other further includes that the first support 10 and the second support 20 rotate at the same time with different speeds. Preferably, the rotation may be achieved when the first support 10 rotates about its own axis. The rotation may further be achieved when the second support 20 rotates about its own axis. Preferably, in the present embodiment, the first support 10 stands still. The first carrier 100 is a set of spiral stairs. The first support 10 and the first carrier 100 are statically connected. Referring to FIG. 2 and FIG. 3, the first recessed portion 11 has a spiral pitch greater than that of the second recessed portion 21. The spiral pitch of the dual-spiral configuration formed by the first recessed portion 11 and the first raised portion 12 is greater than the spiral pitch of the second recessed portion 21. The spiral pitch of the same-direction, same-pitch, dual-spiral configuration formed by the first recessed portion 11 and the first raised portion 12 is greater than the spiral pitch of the second recessed portion 21. Referring to FIG. 2, the second recessed portion 21 and the first recessed portion 11 have different spiral directions. The second recessed portion 21 and the first recessed portion 11 have opposite spiral directions. The second recessed portion 21 and the first raised portion 12 have different spiral directions. The second recessed portion 21 and the first raised portion 12 have opposite spiral directions. The axial displacement occurring when the first recessed portion 11 makes one revolution about the first support 10 is greater than the axial displacement occurring when the second recessed portion 21 makes one revolution about the second support 20. With the foregoing configuration, when the first support 10 stands still and the second support 20 rotates, the first recessed portion 11 of the first support 10 positionally limits the connector 30. The second recessed portion 21 drives the connector 30 to move upward/downward. Preferably, the spiral pitch of the first recessed portion 11 is equal to integer multiples of the spiral pitch of the second recessed portion 21. This is to ensure that at the time the second recessed portion 21 has made several revolutions about the second support 20, the first recessed portion 11 of the first support 10 finishes one revolution, equivalent to the height of one floor. When rotating, the second support 20 drives the second carrier 200 on the connector 30 connected to the second recessed portion 21 to move along the first recessed portion 11.

Preferably, the second recessed portion 21 rotates with the second support 20 while applying a force along the axis of the second support 20 to the connector 30. The second recessed portion 21 rotates with the second support 20 while pushing the connector 30 to move along the axis of the second support 20. When the second support 20 rotates with respect to the first support 10, the force the second recessed portion 21 exerts on the connector 30 along the axis of the second support 20 is greater than the force the first recessed portion 11 exerts on the connector 30 along the axis of the second support 20. With the foregoing configuration, since the connector 30 is connected to the second carrier 200, the second recessed portion 21 of the second support 20 drives the second carrier 200 to move along the axis of the first support 10/second support 20 by its own rotation, while the first recessed portion 11 of the first support 10 guides the second carrier 200 to spirally move upward/downward. Opposite to the known elevators that use drive mechanisms such as steel wires, pulleys, guide rails, and hydraulic drives to drive the elevator cars, the present invention drives the second carrier 200 without complicated, segmented connection because the force-bearing condition of the second carrier 200 is relatively simple. In the present invention, the first support 10 and the second support 20 jointly support the first carrier 100 and the second carrier 200, and the fact that the first carrier 100 and the second carrier 200 are separated by 180° along the circumference of the cross section of the first support 10 causes the force they receive to be fully cancelled by each other. These means that the disclosed elevating apparatus receive less force as compared to the known cantilever-type elevators/elevating apparatuses moving on two rails along the wall. Furthermore, as shown in FIG. 2 and FIG. 3, the first raised portion 12 and the second recessed portion 21 of the present invention support the connector 30 in a simply-supported-beam manner, thus making the second carrier 200 more stable when bearing loads and making the forces exerted on the first support 10 and the second support 20 more balanced as compared to the conventional cantilever-beam-like force-bearing structure. This effectively reduces wear to which the first support 10, the first recessed portion 11, the second support 20, and the second recessed portion 12 might otherwise subject. Additionally, the disclosed simply-supported-beam force-bearing structure when applied to renovation of an existing building can significantly reduce requirements to the original support structure (i.e., the wall) of the existing spiral stairs, and in subsequent use can minimize possible damage to the renovated building, thereby in turn reducing maintenance costs. The disclosed simply-supported-beam force-bearing structure when applied to a newly constructed structure, such as the case where the first support 10 and the second support 20 of the present invention are combined with an existing building structure, only takes a small space and in venture of its good force-bearing structure and simple drive structure, the combination can be easily achieved by attaching the first support 10 and the second support 20 to the existing building structure. Furthermore, the present invention requires no special materials for the first support 10 and the second support 20 to support the first carrier 100 and the second carrier 200, thereby reducing costs.

The elevating apparatus of the present embodiment is suitable for a stairwell or an elevator well with a limited area in a multi-floor building, and is also applicable to outdoor underground and/or overground structures, such as being used as a landscape elevator in an overground landscape platform or an underground landscape construction or an underwater landscape construction. Preferably, the elevating apparatus of the present embodiment may make the second carrier 200 spirally move upward/downward by driving the second support 20. Preferably, a motor may be used to drive the second support 20 to rotate. Preferably, the driver for driving the second support 20 to rotate may be deposited on the top or the bottom of the first support 10 or the second support 20.

Preferably, at least the spiral rise angle of the second recessed portion 21 is smaller than/equal to the friction angle associated to the sliding of the second carrier 200 under its own gravity along the second recessed portion 21. The foregoing configuration provides the following beneficial effects.

Due to comprehensive consideration about safety, wear of braking components of the second carrier 200 and energy consumption for holding the second carrier 200 in a stop position, the present invention enables self-locking of the second carrier 200 by making the spiral rise angle of the second recessed portion 21 smaller than/equal to the friction angle associated with the second carrier 200. The term "self-locking" means that when the second support 20 is not rotating with respect to the first support 10, or both of the first support 10 and the second support 20 are standing still, the second carrier 200 is prevented from unintended going down and even free falling because of gravity. The disclosed elevating apparatus eliminates the risk of free falling that may otherwise happen to normal elevators/elevating apparatuses, and thus provides improved safety. Furthermore, the disclosed elevating apparatus helps save energy and eliminates the need for braking devices, thereby simplifying the overall structure of the elevating apparatus, making it easy to refit and deploy.

Embodiment 2

The present embodiment provides further improvements and/or supplementaries to Embodiment 1, and repetitive description will be omitted for succinctness.

Referring to FIG. 2, in Embodiment 1, the connector 30 forms a simply-supported-beam force-bearing structure with respect to the first support 20. The connector 30 has its one side leaning against the first support 10 through the first recessed portion 11, and has its opposite side leaning against the first support 10 through the first raised portion 12. The following description will be directed to how the connector 30 and the first raised portion 12 connect and/or lean against each other.

Referring to FIG. 3 and FIG. 4, the first support 10 is provided with a first raised portion 12 positionally corresponding to the first carrier 100. Preferably, the first carrier 100 passes through the lateral wall of one side of the first support 10. The terminal of the first carrier 100 may be inserted into the first raised portion 12. The first raised portion 12 has its one side contacting the first carrier 100 and has its opposite side contacting the connector 30. Preferably, the first raised portion 12 may lean against and/or contact the connector 30. Specifically, the first carrier 100 in the present embodiment is a set of spiral stairs. The first carrier 100 includes plural boards for carrying people or articles. Each of the boards has its one end inserted into the first raised portion 12.

Preferably, the first raised portion 12 and the connector 30 may lean against each other. For instance, the terminal of the connector 30 may lie on the first raised portion 12. The terminal of the connector 30 and the first raised portion 12 may be slidable with respect to each other.

Preferably, the first raised portion 12 may be connected to the connector 30. For instance, the first raised portion 12 may be slidably connected to the connector 30. Specifically, the terminal of the connector 30 is provided with a boss. The first raised portion 12 at its side leaning against the boss is provided with a recessed portion for the boss to slide therein. The boss of the connector 30 is configured to slide along the recessed portion of the first raised portion 12. For instance, the first raised portion 12 at is middle is provided with a socket for receiving the terminal of the connector 30. The terminal of the connector 30 is configured to slide or roll along the socket at the terminal.

Preferably, the first raised portion 12 may contact and lean against the connector 30, as shown in FIG. 4. The connector 30 has its terminal on one hand holding the first raised portion 12 and on the other hand leaning against the first raised portion 12 and the terminal of the connector. Referring to FIG. 4, the terminal of the connector 30 is provided with a first connecting arm 31. The first connecting arm 31 and the first raised portion 12 lean against each other. The first connecting arm 31 and the first carrier 100 lean against each other. The connector 30 has its one end opposite to the first connecting arm 31 connected to the second carrier 200. The connector 30 has its end opposite to the first connecting arm 31 leaning against the first recessed portion 11. With the foregoing configuration, the connector 30 has its one end leaning against the first recessed portion 111 of the first support 10 and has its opposite end leaning against the first raised portion 12 of the first support 10, thereby bearing forces in a simply-supported-beam manner.

In a preferred implementation, the first connecting arm 31 is formed by two segments opposite to each other, as shown in FIG. 4. Preferably, the first connecting arm 31 may be of a U-like shape. The first raised portion 12 is located between the two terminals of the first connecting arm 31. Where the second support 20 rotates with respect to the first support 10 to in turn drive the connector 30 to rotate, the first connecting arm 31 slides and/or rolls with respect to the first raised portion in a manner that it grips on the first raised portion 12.

Preferably, the terminal of the first connecting arm 31 is provided with a first rolling member 311. The first connecting arm 31 leans against the first raised portion 12 through the first rolling member 311. The first rolling member 311 may be roller. The terminal of the first connecting arm 31 and the first raised portion 12 are configured to slide and/or roll with respect to each other.

Preferably, the terminal of the connector 30 and the first raised portion 12 can slide and/or roll with respect to each other. The sliding and/or rolling with respect to each other includes the relative sliding and/or rolling between the first rolling member 311 and the first raised portion 12, and further includes the relative sliding and/or rolling between the U-shaped intermediate segment of the first connecting arm 31 and the first raised portion 12. Specifically, a gap exists between the terminal of the connector 30 corresponding to the second carrier 200 and the inner wall of the first support 10, as shown in FIG. 4. The terminal of the connector 30 corresponding to the second carrier 200 and the inner wall of the first support 10 are not in contact. A gap exists between the first connecting arm 31 and the inner wall of the first support 10. A gap exists between the first rolling member 311 and the inner wall of the first support 10. Where a gap exists between the first rolling member 311 and the inner wall of the first support 10, the terminal of the first raised portion 12 leans against the middle segment of the first connecting arm 31, and is slidable. Preferably, a third rolling member (not shown) is provided between the two first rolling members 311 of the first connecting arm 31. Preferably, a third rolling member is provided between two terminals of the first connecting arm 31. The third rolling member rolls with respect to the terminal of the first raised portion 12.

In another preferred implementation, the terminal of the connector 30 corresponding to the second carrier 200 may contact the inner wall of the first support 10. Where the terminal of the connector 30 corresponding to the second carrier 200 contacts the inner wall of the first support 10, the terminal of the connector 30 may be provided with rollers so as to enable relative sliding/rolling between the connector 30 and the inner wall of the first support 10.

In another preferred implementation, the terminal of the connector 30 corresponding to the second carrier 200 may be separated from the first connecting arm 31. The first connecting arm 31 and the terminal of the connector 30 may be telescoped. The first connecting arm 31 may be connected to the connector 30 in a detachable manner. The detachable manner may be achieved by means of threaded connection, pin connection, elastic deformation connection, lock connection, plug connection, etc.

Embodiment 3

The present embodiment provides further improvements and/or supplementaries to Embodiments 1 and 2 and the combination thereof, and repetitive description will be omitted for succinctness.

In Embodiment 1 and Embodiment 2, the connection between the connector 30 and the second recessed portion 21 by means of simple leaning and/or contact is subject to the risk of unintended separation and wear. The present embodiment provides further improvements to the connection between the connector 30 and the second recessed portion 21.

Preferably, the connector 30 is configured to move along the first recessed portion 11. The connector 30 is configured to move along the second recessed portion 21. Preferably, the second recessed portion 21/first recessed portion 11 and the connector 30 move with respect to each other. The connector 30 and/or the second recessed portion 21 may slide and/or roll with respect to each other along the first recessed portion 11.

Preferably, the connector 30 may be further connected to the second recessed portion 21. The connector 30 may be further connected to the first recessed portion 11. In the present implementation, the connection herein may be such made that the connector 30 never comes off the first recessed portion 11 and/or the second recessed portion 21 without the influence of an external force. Preferably, the connector 30 is provided with a second connecting arm 32. Preferably, the connector 30 and the second recessed portion 21 are bound through the second connecting arm 32. The connector 30 is connected to the second recessed portion 21 through the second connecting arm 32. The connector 30 and the second recessed portion 21 lean against each other through the second connecting arm 32.

Figure 5:
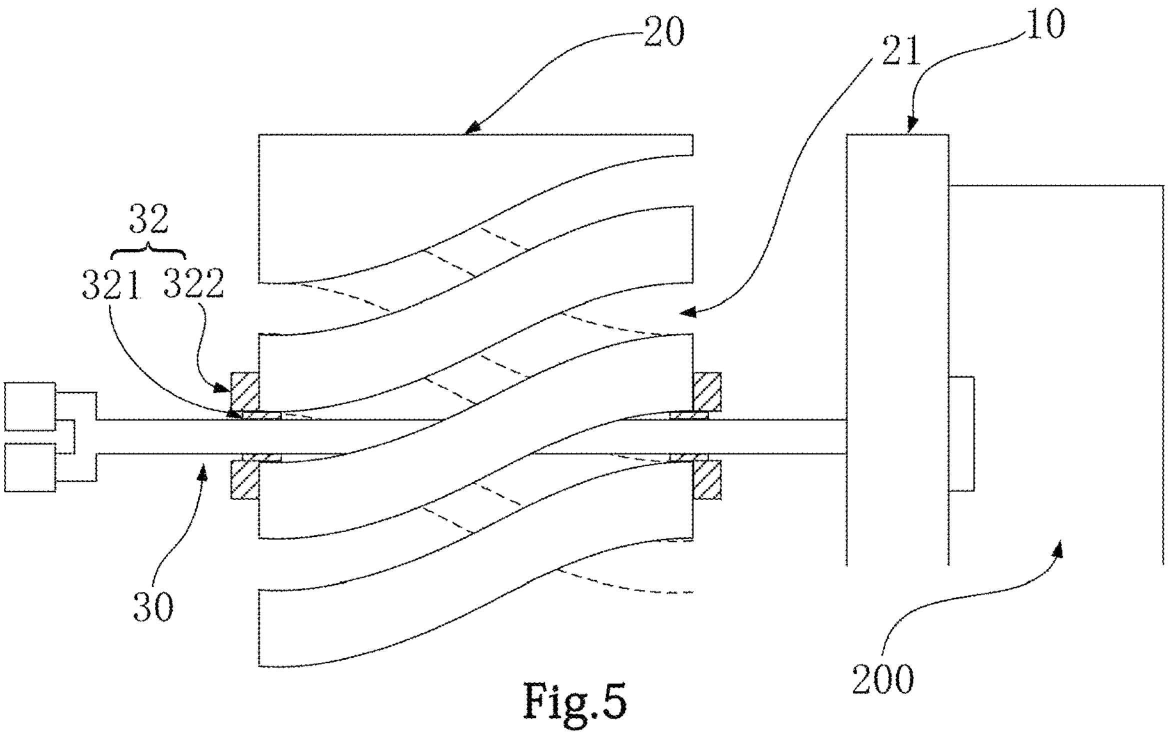
FIG. 5 is a schematic structural drawing of a preferred implementation of the elevating apparatus, showing configurations of the connector and the second recessed portion according to the present invention.
Figure 6:
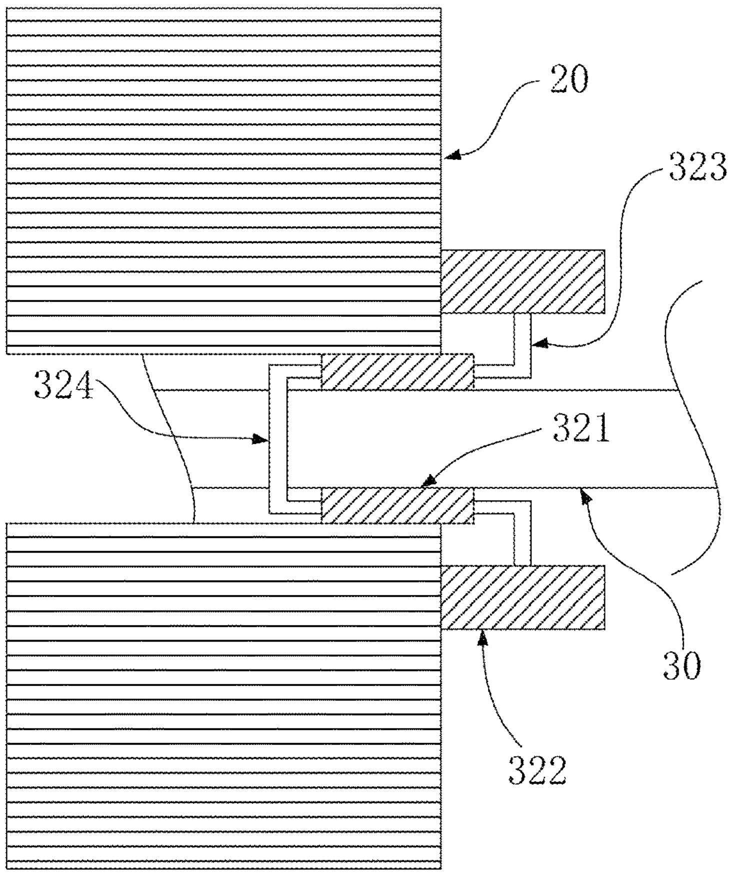
FIG. 6 is a schematic structural drawing of a preferred implementation of the elevating apparatus, showing the second connecting arm according to the present invention.

Referring to FIG. 5 and FIG. 6, the connector 30 is provided with at least one second connecting arm 32. Preferably, the connector 30 is provided with at least one second connecting arm 32 at a place where it leans against/connects the second recessed portion 21. In the present embodiment, the connector 30 is provided with a the two second connecting arms 32. The two second connecting arms 32 are deposited on the places where the connector 30 contacts the second recessed portion 21, respectively, as shown in FIG. 5. Preferably, the second connecting arm 32 includes a second rolling member 321 and a second raised portion 322. Referring to FIG. 5 and FIG. 6, the second rolling member 321 is deposited between the second recessed portion 21 and the connector 30. The second rolling member 321 contacts the second recessed portion 21 and the connector 30, respectively. The second rolling member 321 is configured to rotate about its own axis. The second rolling member 321 serves to reduce friction caused by the relative movement between the second recessed portion 21 and the connector 30. The second rolling member 321 may be a roller or a columnar member. The second rolling member 321 may be elastic or not. The second rolling member 321 may be deformable. The second rolling member 321 may be resilient.

Referring to FIG. 5 and FIG. 6, the second raised portion 322 serves to prevent the connector 30 from performing radial movement along the second support 20. Preferably, the number of the second raised portion 322 may be one, two, three or more. The second raised portion 322 may be deposited on two sides of the connector 30 along the axis of the second support 20. The second raised portion 322 may at least contact the lateral wall of the second support 20. Preferably, the second raised portion 322 may be deposited on the outer side/inner side of the second support 20. The second raised portion 322 may be deposited on the side of the second support 20 facing the first support 10. The second raised portion 322 may be deposited on the side of the second support 20 opposite to the first support 10. Preferably, the two second raised portions 322 are arranged symmetrically with respect to each other. Preferably, the two second connecting arms 32 are arranged symmetrically with respect to each other. As shown in FIG. 5 and FIG. 6, the second raised portions 322 of the two second connecting arms 32 are deposited at the outer side of the second support 20, and serve to positionally limit the connector 30 through the retaining function of the second support 20, thereby preventing the connector 30 from moving in the radial direction of the second support 20. Preferably, the two second raised portions 322 may be alternatively deposited at the inner side of the second support 20. The two second raised portions 322 may be alternatively deposited at the side of the second support 322 opposite to the first support 10.

Preferably, the second raised portion 322 may be a roller. The second raised portion 322 may rotate about its own axis. In a preferred implementation, the second raised portion 322 has its own axis parallel to the axis of the second support 20.

Preferably, the second connecting arm 32 includes a second rod 324. Referring to FIG. 6, the second rod 324 encircles the connector 30. The second rod 324 may be formed as a loop extending around the connector 30. Preferably, the second rod 324 is connected to the connector 30 in a detachable manner. The detachable manner may be achieved by means of threaded connection, pin connection, elastic deformation connection, lock connection, plug connection, etc. Preferably, the second rod 324 is connected to a first rod 323, as shown in FIG. 6. The first rod 323 comprises a first segment and a second segment. The first segment is parallel to the axis of the connector 30. The second segment is perpendicular to the axis of the connector 30. Preferably, the first segment coincides with the axis of the second rolling member 321. The second rolling member 321 encircles the first segment of the first rod 323. With the foregoing configuration, the second rolling member 321 can rotate about the first rod 323. Preferably, the second segment coincides with the axis of the second raised portion 322. The second raised portion 322 encircles the second segment of the first rod 323. With the foregoing configuration, the second raised portion 322 can rotate about the first rod 323. Preferably, the second raised portion 322 can roll about the lateral wall of the second support 20. The second rolling member 321 can roll along the second recessed portion 21.

In another preferred implementation, the second connecting arm 32 does not include the second rod 324. The first rod 323 of the second connecting arm 32 is detachably/undetachably connected to the connector 30. The undetachable connection may be achieved by fixing the terminal of the connector first rod 323 to the connector 30 by means of, for example, soldering, riveting, adhesion, etc. The detachable connection may be achieved by means of threaded connection, pin connection, elastic deformation connection, lock connection, plug connection, etc.

In a preferred implementation, where the gap between the first support 10 and the second support 20 is relatively small, the second raised portion 322 may contact the first support 10 and the second support 20, respectively.

In another preferred implementation, for reducing wear caused by the movement of the connector 30 along the first recessed portion 11, a second rolling member 321 is provided at a place where the connector 30 leans against/connects the first recessed portion 11. Preferably, the second rolling member 321 provided at a place where the connector 30 leans against/connects the first recessed portion 11 may connect the connector 30 through the second rod 324 and the first rod 323. However, the first rod 323 herein may merely include the first segment. Preferably, a second connecting arm 32 is provide at a place where the connector 30 leans against/connects the first recessed portion 11. Preferably, the second connecting arm 32 provided at a place where the connector 30 leans against/connects the first recessed portion 11 may have its second raised portion 322 deposited on the side of the first support 10 facing the second support 20.

Embodiment 4

The present embodiment provides further improvements and/or supplementaries to Embodiments 1, 2 and 3 and combinations thereof, and repetitive description will be omitted for succinctness.

Figure 7:
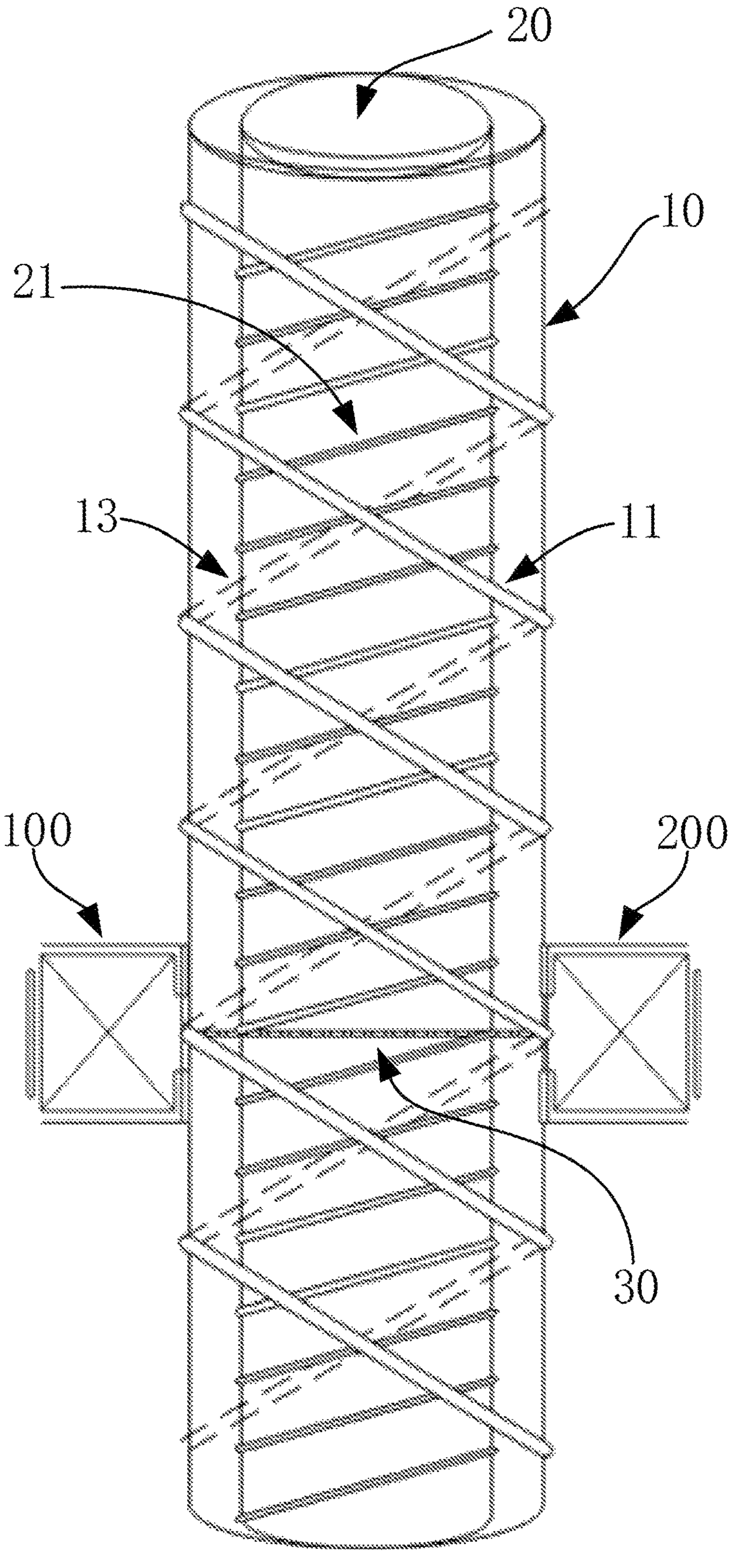
FIG. 7 is a schematic structural drawing of another preferred implementation of the elevating apparatus of the present invention.

In Embodiments 1 and 2, the first carrier 100 is a set of spiral stairs connected to the first support 10. Preferably, in the present embodiment, the first carrier 100 is identical to the second carrier 200, which is configured to spirally move upward/downward along the first support 10, as shown in FIG. 7. Specifically, in the present embodiment, the first carrier 100 and the second carrier 200 are of the same structure. The first carrier 100 may be an elevator car or a carrying platform. The present embodiment replaces the first raised portion 12 with a third recessed portion 13. Preferably, the third recessed portion 13 is identical to the first raised portion 12 in terms of spiral direction and spiral pitch, and forms, together with the first recessed portion 11, double threads. Preferably, the third recessed portion 13 and the first recessed portion 11 are separated by 180° along the circumference of the cross section of the first support 10. With the foregoing configuration, the connector 30 can transverse through the first recessed portion 11, the second recessed portion 21 and the third recessed portion 13, and remain horizontal. Preferably, the first carrier 100 can move along the third recessed portion 13. In other words, the first carrier 100 of the present embodiment spirally moves upward/downward along the third recessed portion 13, while the second carrier 200 spirally moves upward/downward along the first recessed portion 11.

Preferably, the connection between the first carrier 100 and the connector 30 is made similarly to the connection between the second carrier 200 and the connector 30, and repetitive description will be omitted for succinctness. Preferably, the connector 30 is connected to the first support 10, the second support 20 and the second carrier 200 in a way as described with reference to Embodiments 1, 2 and 3. Without causing any conflict or contradiction, the preferred implementations of other embodiments may be entirely and/or partially used as supplementaries to the present embodiment.

With the foregoing configuration, the present embodiment provides the following beneficial effects.

By separating multiple channels, the space surrounding the first support 10 and the second support 20 can be fully used so as to improve the transport capacity. In particular, in virtue of the first recessed portion 11 and the third recessed portion 13 that do not interfere with each other, the transport capacity may be multiplied. Additionally, the first carrier 100 and the second carrier 200 moving with respect to each other around the first support 10 can balance each other, thereby preventing unbalance between the first support 10 and the second support 20 occurring when the second carrier 200 is lifted at one side of the elevating apparatus, and thereby reducing wear/damage that might be otherwise caused to the first support 10 and the second support 20, and preventing the first support 10 and the second support 20 from toppling down.

The present invention has been described with reference to the preferred embodiments and it is understood that the embodiments are not intended to limit the scope of the present invention. Moreover, as the contents disclosed herein should be readily understood and can be implemented by a person skilled in the art, all equivalent changes or modifications which do not come off the concept of the present invention should be encompassed by the appended claims.

The description of the present invention contains a number of inventive concepts, and the applicant reserves the right to file a divisional application based on each of the inventive concepts. The description of the present invention contains a number of inventive concepts, such as "preferably", "according to a preferred embodiment" or "optionally" all indicate that the corresponding paragraph discloses an independent idea, and the applicant reserves the right to file a divisional application based on each of the inventive concepts.

What is claimed is:

1. An elevating apparatus based on a hetero-oriented non-isometric, dual-spiral drive structure, comprising a first carrier and a second carrier, being characteristic in further comprising a first support and a second support that are telescoped together in a manner that the first support and the second support can rotate with respect to each other, the first support is provided with a first recessed portion and a first raised portion that shares the same spiral direction and spiral pitch, the second support is provided with a homo-oriented, isometric, dual-spiral second recessed portion that has a spiral direction different from that of the first recessed portion, wherein the first carrier is connected to the first support along the first raised portion in a manner that the first carrier spirally encircles the first support; and the second carrier acquires a driving force that is provided by rotation of the second support and drives the second carrier to move along the first recessed portion, in a manner that a connector passes through the first recessed portion and the second recessed portion to connect to and/or lean against the first raised portion.

2. The elevating apparatus of claim 1, wherein a homo-oriented, isometric, dual-spiral configuration formed by the first recessed portion and the first raised portion has a spiral pitch that is greater than a spiral pitch of the second recessed portion;

or an axial displacement occurring when the first recessed portion makes one revolution with the first support is greater than an axial displacement when the second recessed portion makes one revolution with the second support.

3. The elevating apparatus of claim 1, wherein where the second support rotates with respect to the first support, a force along an axis of the second support exerted by the second recessed portion on a connector connected to the second carrier is greater than a force along an axis of the second support exerted by the first recessed portion on the connector.

4. The elevating apparatus of claim 1, wherein a connector connected to the first carrier passes through a lateral wall of the first support and extends into the first raised portion, in which the first raised portion and the connector lean against each other.

5. The elevating apparatus of claim 1, wherein a terminal of a connector is provided with a first connecting arm that leans against the first raised portion, in which the first raised portion is located between two terminals of the first connecting arm, in which where the second support rotates with respect to the first support to drive the connector to rotate, the first connecting arm slides and/or rolls with respect to the first raised portion in a manner that the first connecting arm grips on the first raised portion.

6. The elevating apparatus of claim 1, wherein a connector leans against and/or connects with the second recessed portion through a second connecting arm, wherein the second connecting arm includes a second rolling member and a second raised portion, in which the second rolling member is deposited between the second recessed portion and the connector;

the second raised portion serves to prevent the connector from moving along a radial direction of the second support.

7. The elevating apparatus of claim 6, wherein the second connecting arm comprises a first rod, which includes a first segment and a second segment, wherein the second rolling member is sleeved around the first segment of the first rod; and the second raised portion is sleeved around the second segment of the first rod.

8. The elevating apparatus of claim 1, wherein the second raised portion is deposited on one side of the second support that faces the first support, and/or the second raised portion is deposited on one side of the second support that is opposite to the first support.

9. An elevating apparatus based on a hetero-oriented, non-isometric, dual-spiral drive structure, comprising a first support and a second support that are telescoped together in a manner that they can rotate with respect to each other, and comprising a first carrier and a second carrier that spirally encircle the first support, wherein the first support is provided with a first recessed portion that serves to limit the second carrier to spirally move upward/downward and does not interfere with the first carrier, and is further provided with a first raised portion that corresponds to a connection profile of the first carrier and is arranged opposite to the first recessed portion; and the second support is provided with a second recessed portion that serves to provide the first carrier and/or the second carrier with a force along an axis of the first support, in which a connector connected to the second carrier connects and/or leans against the first raised portion in a manner that the connector passes through the first recessed portion and the second recessed portion to be able to form, together with the second support and the first support, a simply-supported-beam force-bearing structure.

10. The elevating apparatus of claim 9, wherein a homo-oriented, isometric, dual-spiral configuration formed by the first recessed portion and the first raised portion has a spiral pitch that is greater than a spiral pitch of the second recessed portion;

or an axial displacement occurring when the first recessed portion makes one revolution with the first support is greater than an axial displacement when the second recessed portion makes one revolution with the second support.

11. The elevating apparatus of claim 9, wherein where the second support rotates with respect to the first support, a force along an axis of the second support exerted by the second recessed portion on the connector connected to the second carrier is greater than a force along an axis of the second support exerted by the first recessed portion on the connector.

12. The elevating apparatus of claim 9, wherein the first carrier passes through a lateral wall of the first support and extends into the first raised portion, in which the first raised portion and the connector lean against each other.

13. The elevating apparatus of claim 9, wherein a terminal of the connector is provided with a first connecting arm that leans against the first raised portion, in which the first raised portion is located between two terminals of the first connecting arm, in which where the second support rotates with respect to the first support to drive the connector to rotate, the first connecting arm slides and/or rolls with respect to the first raised portion in a manner that the first connecting arm grips on the first raised portion.

14. The elevating apparatus of claim 9, wherein the connector leans against and/or connects with the second recessed portion through a second connecting arm, wherein the second connecting arm includes a second rolling member and a second raised portion, in which the second rolling member is deposited between the second recessed portion and the connector;

the second raised portion serves to prevent the connector from moving along a radial direction of the second support.

15. The elevating apparatus of claim 14, wherein the second connecting arm comprises a first rod, which includes a first segment and a second segment, wherein the second rolling member is sleeved around the first segment of the first rod; and the second raised portion is sleeved around the second segment of the first rod.

16. The elevating apparatus of claim 9, wherein the second raised portion is deposited on one side of the second support that faces the first support, and/or the second raised portion is deposited on one side of the second support that is opposite to the first support.

17. An elevating apparatus based on a hetero-oriented, non-isometric, dual-spiral drive structure, being characteristic in comprising a first support and a second support that are telescoped together in a manner that they can rotate with respect to each other, the first support is provided with a first recessed portion and a first raised portion that share the same spiral direction and spiral pitch, the second support is provided with a second recessed portion that has a spiral direction different from that of the first recessed portion and has opposite openings in the second recessed portion's radial section, wherein a first carrier is such configured that it spirally encircles the first support along the first raised portion; and a connector connected to the second carrier acquires, in a manner that it passes through the first recessed portion and the second recessed portion to connect to and/or lean against the first raised portion, a driving force that is provided by rotation of the second support and drives the second carrier to move along the first recessed portion.

18. The elevating apparatus of claim 17, wherein a homo-oriented, isometric, dual-spiral configuration formed by the first recessed portion and the first raised portion has a spiral pitch that is greater than a spiral pitch of the second recessed portion;

or an axial displacement occurring when the first recessed portion makes one revolution with the first support is greater than an axial displacement when the second recessed portion makes one revolution with the second support.

19. The elevating apparatus of claim 17, wherein where the second support rotates with respect to the first support, a force along an axis of the second support exerted by the second recessed portion on the connector connected to the second carrier is greater than a force along an axis of the second support exerted by the first recessed portion on the connector.

20. The elevating apparatus of claim 17, wherein the first carrier passes through a lateral wall of the first support and extends into the first raised portion, in which the first raised portion and the connector lean against each other.

* * * * *